(12) United States Patent
Devic et al.

(10) Patent No.: US 6,447,743 B1
(45) Date of Patent: Sep. 10, 2002

(54) METHOD FOR PREPARING AN AQUEOUS HYDROGEN PEROXIDE SOLUTION DIRECTLY FROM HYDROGEN AND OXYGEN

(75) Inventors: Michel Devic, Saint Foy lés Lyon; Lionel Delais, Senlis, both of (FR)

(73) Assignee: Atofina (FR)

( * ) Notice: Subject to any disclaimer, the term of this patent is extended or adjusted under 35 U.S.C. 154(b) by 0 days.

(21) Appl. No.: 09/601,967

(22) PCT Filed: Jan. 29, 1999

(86) PCT No.: PCT/FR99/00186

§ 371 (c)(1),
(2), (4) Date: Aug. 9, 2000

(87) PCT Pub. No.: WO99/41190

PCT Pub. Date: Jan. 19, 1999

(30) Foreign Application Priority Data

Feb. 10, 1998 (FR) ............................................. 98 01524

(51) Int. Cl.[7] .............................................. C01B 15/01
(52) U.S. Cl. ....................................................... 423/584
(58) Field of Search .......................................... 423/584

(56) References Cited

U.S. PATENT DOCUMENTS

| | | | | |
|---|---|---|---|---|
| 5,194,242 A | * | 3/1993 | Paoli | 423/584 |
| 5,480,629 A | * | 1/1996 | Thompson et al. | 423/584 |
| 6,210,651 B1 | * | 4/2001 | Nystrom et al. | 423/584 |
| 2001/0003578 A1 | * | 6/2001 | Fischer et al. | 423/584 |

* cited by examiner

*Primary Examiner*—Stanley S. Silverman
*Assistant Examiner*—Edward M. Johnson
(74) *Attorney, Agent, or Firm*—Pennie & Edmonds LLP

(57) ABSTRACT

A catalytic process and a device for preparing, in absolute safely, aqueous hydrogen peroxide solutions at high concentration levels directly from hydrogen and oxygen; more particularly, a method whereby hydrogen and oxygen are injected, into the aqueous medium in proportions corresponding to the flammability range of the hydrogen-oxygen mixture, and are present in proportions outside the flammability range in the continuous gas phase. The invention also concerns a device for implementing the method.

13 Claims, 1 Drawing Sheet

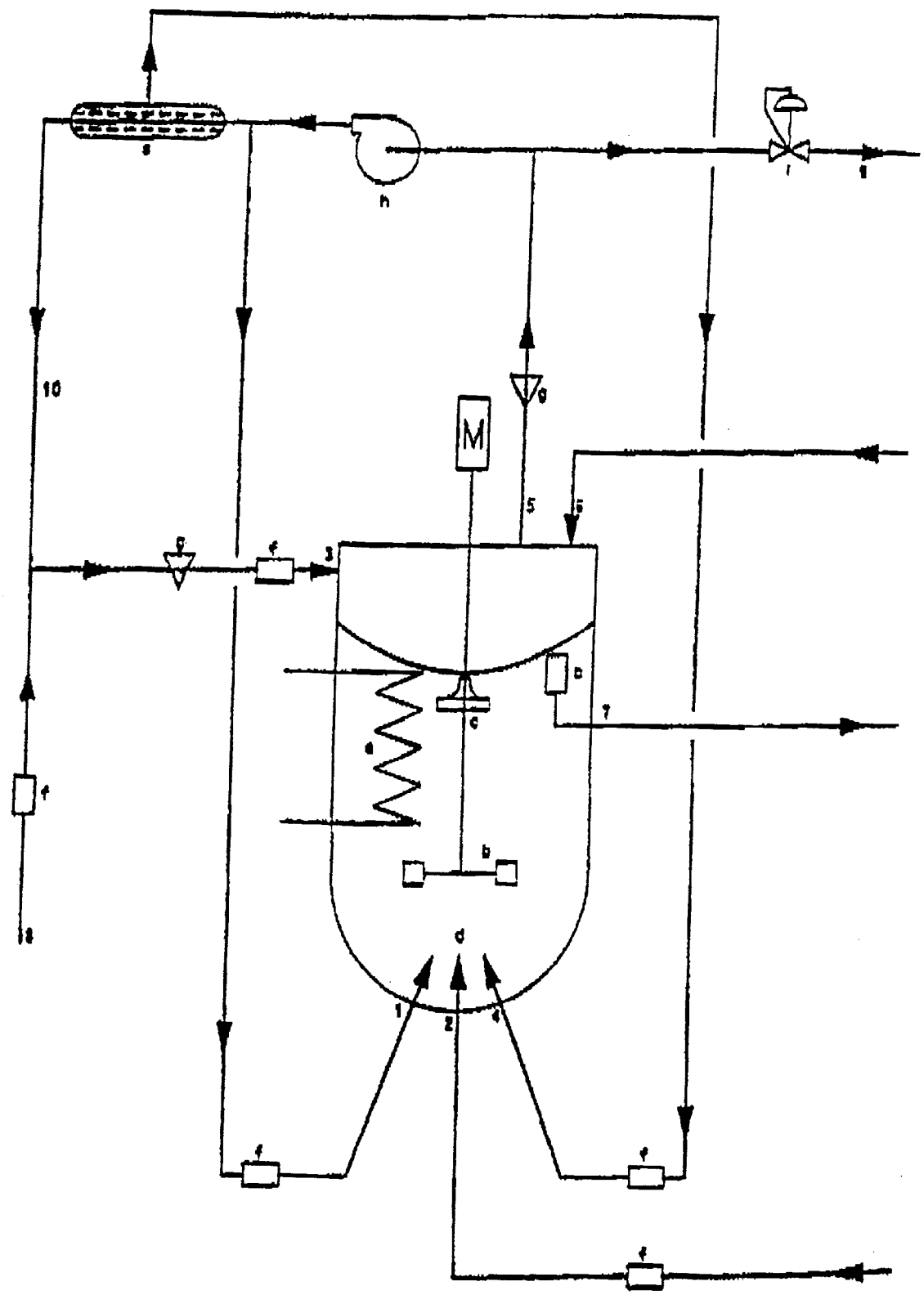

METHOD FOR PREPARING AN AQUEOUS HYDROGEN PEROXIDE SOLUTION DIRECTLY FROM HYDROGEN AND OXYGEN

The present invention relates to a catalytic process and to a device for preparing, in perfect safety, aqueous hydrogen peroxide solutions at high concentrations directly from hydrogen and oxygen. More particularly, a subject-matter of the invention is a process in which hydrogen and oxygen are injected into the aqueous medium in proportions corresponding to the flammability range of the hydrogen-oxygen mixture and are present in proportions outside the flammability range in the continuous gas phase. Another subject-matter of the invention is a device for the implementation of the process.

The hydrogen and oxygen gas mixture is known to be flammable, even explosive, when hydrogen is present at molar concentrations of between 4 and 94% under standard temperature and pressure conditions, that is to say when the ratio of the hydrogen molar concentration to the oxygen molar concentration is greater than 0.0416 (Encyclopédie des Gaz [Encyclopedia of Gases], Air Liquide, page 909).

To avoid any risk of explosion or fire, it is recommended either to operate with a hydrogen/oxygen ratio below the lower flammability limit or to use an inert gas, such as nitrogen, argon, helium or neon (U.S. Pat. Nos. 4,681,751, 4,009,252, EP 0,787,681).

In point of fact, to obtain satisfactory results, it is necessary to work with a hydrogen/oxygen ratio situated in the flammability range. Thus, the document U.S. Pat. No. 4,009,252 discloses a hydrogen/oxygen molar ratio of between 1/20 and 1/1.5 and preferably of between 1/10 and 1/2. Likewise, the document U.S. Pat. No. 4,336,239 teaches the reader to operate in the presence of a hydrogen/oxygen molar ratio of less than 0.2 and preferably of between 1/15 and 1/12.

The term "direct synthesis of an aqueous hydrogen peroxide solution" is understood to denote the synthesis of hydrogen peroxide from hydrogen and oxygen in an aqueous medium comprising a catalyst.

The direct synthesis of an aqueous hydrogen peroxide solution, continuously or batchwise, in a stirred reactor has formed the subject of many studies. The reactor generally comprises an aqueous region, occupied by the working solution and the catalyst, and a region, occupied by the gases, situated above the aqueous region. It is equipped with a stirring system which makes it possible both to stir the aqueous region and to disperse the gases in the aqueous phase. The reactants, namely the hydrogen and the oxygen, and the inert gases are injected into the region of the gases.

The term "working solution" is understood to denote the aqueous medium, comprising water, acids and optionally decomposition inhibitors or stabilizers for hydrogen peroxide, in which the hydrogen peroxide is formed.

It has been observed that when the direct synthesis of an aqueous hydrogen peroxide solution is carried out in a stirred reactor as described above, the catalyst, thrown under the effect of the stirring on to the walls of the reactor and the shaft of the stirrer which are situated in the region of the gases, would be in direct contact with the reactants. During the synthesis, the catalyst particles in the region of the gases will dry out and will spontaneously bring about the ignition of the hydrogen-oxygen gas mixture if the molar concentration of the hydrogen is greater than 0.04.

This is why, in Example 1 of document U.S. Pat. No. 4,279,883, which illustrates the direct continuous synthesis of an aqueous hydrogen peroxide solution in a stirred reactor, a hydrogen, oxygen and nitrogen gas mixture are introduced continuously into the gaseous region of the reactor, so that the hydrogen, oxygen and nitrogen partial pressures in the gases collected at the outlet are maintained respectively at 5, 49 and 113 atmospheres, that is to say a hydrogen molar concentration of 3%. The industrial manufacture of an aqueous hydrogen peroxide solution under the safety conditions according to the document U.S. Pat. No. 4,279,883 is economically out of the question, however, given the low concentration of the aqueous hydrogen peroxide solution obtained.

In order to be usable, this aqueous solution requires an additional concentration stage.

The direct synthesis of an aqueous hydrogen peroxide solution can also be carried out in a tubular reactor composed of a long pipe (pipeline) filled with working solution in which the catalyst is suspended and into which gaseous oxygen and hydrogen are injected in the form of small bubbles in proportions above the lower flammability limit of the hydrogen-oxygen mixture (U.S. Pat. No. 5,194,242). The safety of such a process is only assured provided that the gaseous reactants are maintained in the reactor in the form of small bubbles. According to the document U.S. Pat. No. 5,641,467, the latter can only be obtained with a high rate of circulation of the working solution.

A catalytic process and a device have now been found which make it possible to prepare aqueous hydrogen peroxide solutions at high concentrations directly from hydrogen and oxygen in a stirred reactor in perfect safety and economically.

This process is characterized in that hydrogen and oxygen are injected, in the form of small bubbles, into the lower part of the aqueous reaction medium, which has been rendered acidic by the addition of a mineral acid and which comprises a catalyst in the dispersed state, with molar flow rates such that the ratio of the hydrogen molar flow rate to the oxygen molar flow rate is greater than 0.0416 and in that oxygen is introduced into the continuous gas phase and/or into the upper part of the aqueous reaction medium in an amount such that the molar ratio of hydrogen to oxygen in the continuous gas phase is less than 0.0416.

The term "small bubbles" is understood to denote bubbles with a mean diameter of less than 3 mm.

The injections of hydrogen and of oxygen in the form of small bubbles into the lower part of the aqueous reaction medium are preferably situated at the bottom of the stirred reactor and are preferably contagious, in order for the $H_2$ and $O_2$ bubbles to mix together as quickly as possible.

Mention may be made, as mineral acid, of, for example, sulphuric acid and orthophosphoric acid.

The aqueous reaction medium can additionally comprise stabilizers for hydrogen peroxide, such as, for example, phosphonates or tin, and decomposition inhibitors, such as, for example, halides. The bromide is the particularly preferred inhibitor and it is advantageously used in combination with bromine in the free state ($Br_2$).

According to the invention, the oxygen injected, in the form of small bubbles, into the lower part of the aqueous reaction medium and the oxygen introduced into the continuous gas phase and/or into the upper part of the aqueous reaction medium can additionally comprise hydrogen in an amount such that the ratio of molar concentration of hydrogen to molar concentration of oxygen is less than 0.0416.

According to the present invention, the operation can be carried out just as easily continuously as semi-continuously.

The oxygen feed in the form of small aqueous into the lower part of the aqueous reaction medium can be provided in all or in part by the gaseous effluent at the outlet of the reactor.

It is also possible to use the gaseous effluent at the outlet of the reactor to feed the continuous gas phase and/or the upper part of the aqueous reaction medium. In this case, the composition of the gaseous effluent can be adjusted by addition of oxygen and optionally by removal of hydrogen, so that the ratio of the molar concentration of hydrogen to the molar concentration of oxygen in the continuous gas phase is less than 0.0416.

The catalyst generally used comprises at least one element chosen from metals from Group IB and VIII of the Periodic Table. Advantageously, gold, platinum, palladium and ruthenium are chosen. Use is preferably made of palladium, platinum or the palladium-platinum combination or better still palladium or the palladium-platinum combination.

In the case of a palladium-platinum composite catalyst, the platinum preferably represents between 1 and 50% of the total weight of the metals and better still approximately 2%.

According to the invention, the catalyst can also be supported. The supports generally used are, for example, silica, alumina, silica-aluminas and titanium dioxide.

The supported or non-supported catalyst is generally suspended in the aqueous reaction medium. Use is preferably made of a supported catalyst and better still of a supported catalyst comprising between 0.2 and 2% by weight of metal or metals with respect to the support.

The temperature and the pressure prevailing inside the reactor are adjusted in order to optimize the selectivity of the reaction with respect to hydrogen and the productivity with regard to hydrogen peroxide.

The temperature is generally between 0 and 60° C. and preferably between 5 and 30° C.

The pressure prevailing inside the reactor is generally above atmospheric pressure and preferably between 30 and 100 bar and advantageously between 40 and 60 bar.

The ratio of the molar flow rate of hydrogen to the molar flow rate of oxygen which are injected into the lower part of the aqueous reaction medium can vary within wide limits. It is preferably between 0.05 and 5 and more particularly between 0.2 and 1. A molar ratio in the region of 0.3 is advantageously used.

When the operation is carried out semi-continuously, all of the working solution and all the catalyst are introduced into the reactor before the beginning of the direct synthesis and the hydrogen and the oxygen are introduced continuously.

It is also possible to feed the reactor continuously with the working solution, to which the catalyst has been added, and to introduce the hydrogen and the oxygen continuously. In this case, the solution comprising the hydrogen peroxide formed is extracted continuously from the reactor.

The catalyst is subsequently separated, by filtration of the final solution comprising the hydrogen peroxide formed under semi-continuous conditions or of the hydrogen peroxide solution extracted continuously from the reactor, and then optionally reintroduced into the reactor.

When the reactor is equipped with a filter, the catalyst is held permanently in the reactor and the hydrogen peroxide solution is extracted and filtered simultaneously.

Another subject-matter of the invention is a device which makes it possible to manufacture, in perfect safety and economically, concentrated aqueous hydrogen peroxide solutions directly from hydrogen and oxygen. This device, comprising a stirred reactor fed continuously or non-continuously with working solution, is characterized in that the reactor is equipped (i) with one or more inlet(s) for gaseous hydrogen, in the form of small bubbles, into the lower part of the aqueous reaction medium; (ii) with one or more inlet(s) for gaseous oxygen optionally comprising hydrogen, in the form of small bubbles, into the lower part of the aqueous reaction medium, the inlet(s) for oxygen into the liquid phase are preferably contiguous with that (those) for hydrogen, in order for the $H_2$ and $O_2$ bubbles to mix together quickly, (iii) with a pressure regulator which makes it possible to keep the pressure prevailing inside the reactor constant by discharging excess unconsumed gaseous reactants; and (iv) with one or more inlet(s) for gaseous oxygen optionally comprising hydrogen into the continuous gas phase and/or into the upper part of the aqueous reaction medium, which is/are controlled by an analyser of the gas flow exiting from the reactor, so that the molar ratio of hydrogen to oxygen in the continuous gas phase is less than 0.0416.

The reactor is equipped with an outlet which makes possible the continuous or semi-continuous extraction of the aqueous hydrogen peroxide solution. This outlet is optionally equipped with a filter which makes it possible to separate the catalyst from the aqueous hydrogen peroxide solution.

According to the invention, the gas flow exiting from the reactor can be reinjected into the circuit feeding the lower part of the aqueous reaction medium with oxygen. This gas flow, after optional adjustment of the hydrogen content by addition of oxygen and optionally by removal of hydrogen, for example by using a membrane, can also be reinjected into the circuit feeding the continuous gas phase with oxygen and/or the upper part of the aqueous reaction medium. The hydrogen thus separated can be reinjected into the lower part of the aqueous reaction medium.

Preferably, at least one inlet for hydrogen and at least one inlet for oxygen, in the form of small bubbles, into the lower part of the aqueous reaction medium are situated at the bottom of the stirred reactor.

The reactor can be an autoclave of cylindrical, cylindro-conical or spherical shape stirred by means of a vertical shaft equipped with one or more impellers or one or more turbines.

Generally, any reactor commonly used when a suspended catalyst is involved and which is capable of providing good heat exchange and of maintaining the gaseous reactants of the reaction in the form of a cloud of larger possible number of small bubbles may be suitable.

The stirring can also be provided by several independent impellers or turbines each driven by a stirrer shaft which is attached to the bottom or to the lid or to the sides of the reactor. The turbine situated in the upper part of the aqueous reaction medium can be of the "self-suction" type, that is to say that it sucks the continuous gas phase of the reactor from the stirrer shaft, which is hollow, and then diffuses this gas phase into the aqueous reaction medium, or of "flanged" type.

The stirring can be supplemented by devices commonly used to render the stirring highly efficient, such as, for example, one or more baffles positioned vertically or radially.

Use is generally made of heat exchangers, such as tubular coils, bundles of vertical pipes or else set of radial vertical plates or else wound spirals, in order to provide for the regulation of the temperature of the reaction medium. These exchangers are preferably situated inside the reactor. Use is advantageously made of a vertical tubular bundle or wound spirals or a bundle of vertical plates positioned radially.

The temperature of the mixture can also be regulated by using a jacketed reactor with circulation of water.

The reactor according to the invention is designed so that, if the stirring is accidentally halted, all the gas bubbles can rise and reach directly the continuous gas phase solely under the action of gravitational forces. The various devices installed inside the reactor in order to provide for the heat exchanges and/or the stirring must not form an obstacle to the rise of bubbles and must not result in the formation of pockets of gas inside the aqueous reaction medium.

The reactor can be composed of any material compatible with the reactants used. Use may be made, for example, of metals, such as stainless steels of 304L or 316L type of Hastelloy alloys, or else metals coated with chemically resistant polymers, such as PVDF (polyvinylidene fluoride), PTFE (polytetrafluoroethylene), PFA (copolymer of $C_2F_4$ and of perfluorinated vinyl other) or FEP (copolymer of $C_2F_4$ and of $C_3F_6$.

The feeds of oxygen or of hydrogen, in the form of small bubbles, into the lower part of the aqueous reaction medium can be provided by pipes or plates made of sintered metal or else various types of nozzle which make it possible to eject gas at a high rate and thus bring about the formation of many small bubbles.

A device and a block diagram illustrating an embodiment of the process of the present invention, which are represented in the single Figure, are described hereinbelow.

The device comprises a reactor stirred by means of a vertical shaft equipped with a self-suction turbine a and with a turbomixer b. On start-up: the reactor comprises the catalyst suspended in the working solution, the combined mixture being brought to the reaction temperature.

the oxygen introduced into the continuous gas phase at 3 originates from the flow 8, that is to say from non-recycled oxygen, and, the hydrogen injected at the bottom of the reactor is fed via 2.

A pressure regulator i makes it possible to keep the pressure prevailing inside the reactor constant by discharging excess unconsumed gaseous reactants 9. Likewise, the temperature of the reaction medium is kept constant by virtue of the exchanger e.

The following are continuously introduced into the reactor: at 6, the working solution; at 2 and 4, hydrogen in the form of small bubbles; at 1, oxygen in the form of small bubbles; at 3, oxygen in an amount such that the molar concentration of hydrogen in the continuous gas phase is always less than 4%.

The feed system at 3 is controlled by the in-line analyser g of the gas flow 5 exiting from the reactor. The oxygen feed at 3 is provided by the flow 8 and by the flow 10; the latter originates from the gaseous effluent at the outlet of the reactor after removal of the hydrogen through a membrane s. The hydrogen thus removed provides for the partial hydrogen feed 4 into the lower part of the reaction medium.

The oxygen 1 injected into the lower part of the reaction medium originates entirely from the gaseous effluent at the outlet of the reactor and comprises hydrogen.

All the gas flow rates are regulated using mass flowmeters f. The flow rates for oxygen and for hydrogen injected into the lower part of the reaction medium are such that the ratio of the hydrogen molar flow rate to the oxygen molar flow rate is always greater than 0.0416.

The injection nozzles d make it possible to inject the reactants in the form of small bubbles.

The pump h provides for the recycling of unconsumed hydrogen and unconsumed oxygen.

The aqueous solution comprising the hydrogen peroxide formed is simultaneously separated from the catalyst using the filter c and extracted continuously, 7.

Other specific embodiments are given in the following examples.

EXPERIMENTAL PART

Preparation of the Catalyst

The catalyst used comprises 0.8% by weight of metallic palladium and 0.04% by weight of platinum, these being supported on a microporous silica. It is prepared by impregnating silica from the Company Aldrich (ref. 28,851–9), having the following characteristics:

Mean particle size=5 to 15 $\mu$m
BET surface=500 $m^2/g$
Pore volume: 0.75 $cm^3/g$
Mean pore diameter: 60 Å with an aqueous solution comprising $PdCl_2$ and $H_2PtCl_6$, followed by drying and finally by heat treatment while flushing with hydrogen at 300° C. for 3 hours.

The Reactor

The reactor is a jacketed stainless steel autoclave with water circulation and a capacity of 100 $cm^3$, the internal walls of which are coated with PTFE. It is equipped with a stirrer comprising a vertical shaft with a turbine comprising six radial blades. The reactor is also equipped with two inlets made of PTFE capillary tube situated at the bottom of the reactor which make it possible to inject hydrogen and oxygen, in the form of small bubbles, into the lower part of the aqueous reaction medium. It is furthermore equipped with an inlet situated in the lid of the autoclave which makes it possible to introduce oxygen so that the molar ratio of hydrogen to oxygen in the continuous gas phase is always less than 0.0416, that is to say outside the flammability range of the peroxide-oxygen mixture.

The injection of the reactants into the aqueous medium and the injection of the oxygen into the continuous gas phase are regulated using mass flowmeters.

The pressure prevailing inside the reactor is kept constant by virtue of a discharging device. The hydrogen and the oxygen constituting the gas flow exiting from the reactor are quantitatively determined in line by gas chromatography.

Preparation of an Aqueous Solution (I)

An aqueous solution is prepared by addition of 0.5 g [lacuna] $H_3PO_4$, 2.5 g [lacuna] $H_2SO_4$ and 50 mg of sodium bromide to 1000 $cm^3$ of distilled water and 5 mg of $Br_2$ in the form of 1% bromine water.

General Procedure 50 g of the aqueous solution (I) and 0.3 g of catalyst are introduced into the autoclave and then the aqueous reaction medium is brought to and maintained at the desired temperature. The inlet for oxygen into the continuous gas phase is subsequently opened. The pressure in the autoclave increases to the chosen value and it is then kept constant by virtue of the pressure regulator.

The hydrogen and the oxygen are subsequently injected into the aqueous reaction medium in the chosen proportions and then the hydrogen in the gas flow exiting from the pressure regulator is quantitatively determined every 10 minutes.

After the desired reaction duration, the inlet for hydrogen and oxygen into the aqueous reaction medium is turned off and the injection of oxygen into the continuous gas phase is maintained until hydrogen has completely disappeared from the latter. The inlet for oxygen is then turned off, the reactor is then decompressed and, finally, the aqueous hydrogen peroxide solution is recovered.

The aqueous hydrogen peroxide solution recovered is subsequently weighed and then separated from the catalyst by filtration through a filter. The resulting solution is then quantitatively determined by iodometry, thus making it possible to determine the hydrogen peroxide concentration.

The consumption of hydrogen is measured by [lacuna] difference between the amount injected and the amount which has exited from the reactor.

The selectivity of the direct synthesis of hydrogen peroxide with respect to hydrogen is defined as being the percentage of the number of moles of hydrogen peroxide which is formed to the number of moles of hydrogen which is consumed.

The operating conditions and the results obtained during the various tests (Examples 1 to 10) are combined in Table

TABLE I

| EXAMPLE | TEMPERATURE (° C.) | DORATION (HOUR) | FLOW RATE FOR $H_2$ INJECTED INTO THE AQUEOUS MEDIUM Sl/b | FLOW RATE FOR $O_2$ INJECTED INTO THE AQUEOUS MEDIUM Sl/b | RATIO OF $H_2/O_2$ RATES, RATES, AQUEOUS MEDIUM |
|---|---|---|---|---|---|
| 1 | 20 | 3 | 4 | 0.1 | 40 |
| 2 | 20 | 3 | 4 | 1 | 4 |
| 3 | 20 | 3 | 4 | 2 | 2 |
| 4 | 20 | 3 | 4 | 3 | 1.3 |
| 5 | 20 | 3 | 4 | 4 | 1 |
| 6 | 20 | 3 | 4 | 6 | 0.67 |
| 7 | 20 | 3 | 4 | 8 | 0.5 |
| 8 | 12 | 5 | 2 | 0.01 | 200 |
| 9 | 12 | 5 | 2 | 9 | 0.2 |
| 10 | 12 | 5 | 2 | 2 | 1 |

| EXAMPLE | FLOW RATE FOR $O_2$ INJECTED INTO THE CONTINUOUS GAS PHASE Sl/h | RATIO OF $H_2/O_2$ FLOW RATES, INJECTED TOTAL | $H_2O_2$ CONCENTRATION OF THE SOLUTION % | SELECTIVITY WITH RESPECT TO $H_2$ % |
|---|---|---|---|---|
| 1 | 95 | 0.042 | 15 | 60 |
| 2 | 95 | 0.041 | 17 | 69 |
| 3 | 94 | 0.041 | 18 | 72 |
| 4 | 93 | 0.041 | 17 | 75 |
| 5 | 92 | 0.041 | 17 | 77 |
| 6 | 90 | 0.041 | 15 | 81 |
| 7 | 88 | 0.041 | 13 | 82 |
| 8 | 48 | 0.041 | 15 | 41 |
| 9 | 39 | 0.041 | 7 | 88 |
| 10 | 46 | 0.041 | 13 | 88 |

EXAMPLES 11 TO 13

Use is made of a cylindrical reactor made of type 316 L stainless steel with an internal diameter of 98 mm, a height of 200 mm and a total capacity of 1500 cm³. The internal walls of the reactor are coated with a PTFE layer with a thickness of 1 millimeter.

Stirring is provided by a vertical shaft equipped with a flanged turbine, the suction of which is directed downwards. The flanged turbine with a diameter of 45 mm, situated in the middle of the reactor, is equipped with eight blades.

An axial propeller with a diameter of 30 mm, equipped with six inclined blades, is attached to the end of the vertical shaft close to the bottom of the reactor.

The reactor is also equipped with four vertical baffles and with a heat exchanger with a bundle of 8 vertical tubes in which water circulates at 17° C.

The hydrogen and the oxygen are injected into the liquid phase using two stainless steel tubes, the inlets of which are contiguous and are situated close to the axial propeller.

The procedure of the preceding examples is used, except that 700 g of aqueous solution (I) and 6 g of catalyst are used.

The operating conditions and the results obtained during the tests (Examples 11 to 13) are combined in Table II.

TABLE II

| EXAMPLE | TEMPERATURE (° C.) | DORATION (HOUR) | FLOW RATE FOR $H_2$ INJECTED INTO THE AQUEOUS MEDIUM Sl/b | FLOW RATE FOR $O_2$ INJECTED INTO THE AQUEOUS MEDIUM Sl/b | RATIO OF $H_2/O_2$ RATES, RATES, AQUEOUS MEDIUM |
|---|---|---|---|---|---|
| 11 | 21 | 3 | 120 | 300 | 0.4 |
| 12 | 21 | 3 | 80 | 160 | 0.5 |
| 13 | 20 | 3 | 80 | 188 | 0.42 |

| EXAMPLE | FLOW RATE FOR $O_2$ INJECTED INTO THE CONTINUOUS GAS PHASE Sl/h | RATIO OF $H_2/O_2$ FLOW RATES, INJECTED TOTAL | $H_2O_2$ CONCENTRATION OF THE SOLUTION % | SELECTIVITY WITH RESPECT TO $H_2$ % |
|---|---|---|---|---|
| 11 | 2850 | 0.04 | 20.1 | 83 |
| 12 | 1760 | 0.04 | 15.3 | 84 |
| 13 | 1760 | 0.039 | 16.2 | 85 |

What is claimed is:

1. Process for the preparation of an aqueous hydrogen peroxide solution directly from hydrogen and oxygen, which comprises:

providing a stirred reactor containing an aqueous reaction medium, wherein the aqueous reaction medium comprises a catalyst in a dispersed state and has a lower part and an upper part;

adding a mineral acid to the aqueous medium so that the aqueous medium becomes acidic;

injecting hydrogen and oxygen, in the form of small bubbles, into the lower part of the aqueous reaction medium a hydrogen molar flow rate and an oxygen molar flow rate, wherein the ratio of the hydrogen molar flow rate to the oxygen molar flow rate is greater than 0.0416; and introducing oxygen into a continuous gas phase in the stirred reactor and/or into the upper part of the aqueous reaction medium in an amount such that the molar ratio of hydrogen to oxygen in the continuous gas phase is less than 0.0416.

2. Process according to claim 1, wherein the injections of hydrogen and of oxygen in the form of small bubbles into the lower part of the aqueous reaction medium are situated at the bottom of the stirred reactor.

3. Process according to claim 1, wherein the injections of hydrogen and oxygen into the lower part of the aqueous reaction medium are contiguous.

4. Process according to any one of claims 1 to 3, wherein the reaction medium comprises stabilizers for hydrogen peroxide.

5. Process according to claim 1, wherein the reaction medium comprises halides.

6. Process according to claim 5, wherein the halide is the bromide.

7. Process according to claim 6, wherein the bromide is used in combination with bromine in the free state.

8. Process according to claim 1, wherein the catalyst comprises palladium.

9. Process according to claim 1 wherein the catalyst comprises platinum.

10. Process according to claim 1 wherein the catalyst is supported.

11. Process according to claim 10, wherein the support is chosen from silica, alumina and silica-aluminas.

12. Process according to claim 1, wherein the oxygen, which is introduced into the continuous gas phase and/or into the upper part of the aqueous reaction medium, comprises hydrogen.

13. Process according to claim 1, wherein the oxygen, which is injected into the lower part of the aqueous reaction medium, comprises hydrogen.

* * * * *